United States Patent
Paul et al.

(10) Patent No.: US 9,327,318 B2
(45) Date of Patent: May 3, 2016

(54) SNAP FIT SCREEN PANEL AND FIXING SYSTEM

(71) Applicant: TEGA INDUSTRIES LIMITED, Kolkata, West Bengal (IN)

(72) Inventors: Biswadeep Paul, West Bengal (IN); Debashis Koley, West Bengal (IN); Tanmay Moharana, West Bengal (IN)

(73) Assignee: TEGA INDUSTRIES LIMITED, Kolkata, West Bengal (IN)

( * ) Notice: Subject to any disclaimer, the term of this patent is extended or adjusted under 35 U.S.C. 154(b) by 0 days.

(21) Appl. No.: 14/443,892

(22) PCT Filed: Jul. 19, 2013

(86) PCT No.: PCT/IN2013/000451
§ 371 (c)(1),
(2) Date: May 19, 2015

(87) PCT Pub. No.: WO2014/080415
PCT Pub. Date: May 30, 2014

(65) Prior Publication Data
US 2015/0290682 A1    Oct. 15, 2015

(30) Foreign Application Priority Data
Nov. 20, 2012   (IN) ............................ 1330/KOL/2012

(51) Int. Cl.
*B07B 1/49* (2006.01)
*B07B 1/46* (2006.01)
*F16B 5/06* (2006.01)

(52) U.S. Cl.
CPC ................ *B07B 1/46* (2013.01); *B07B 1/4645* (2013.01); *F16B 5/0635* (2013.01); *B07B 2201/02* (2013.01)

(58) Field of Classification Search
CPC ...... B07B 1/46; B07B 1/4645; B07B 2201/02
USPC .......................................... 209/405
See application file for complete search history.

(56) References Cited

U.S. PATENT DOCUMENTS

| 3,042,206 A | 7/1962 | Olender |
| 4,265,742 A | 5/1981 | Buecker et al. |
| 5,377,846 A * | 1/1995 | Askew ...................... E04C 2/42 209/399 |

(Continued)

FOREIGN PATENT DOCUMENTS

| DE | 87 12 708 U1 | 11/1987 |
| EP | 0 291 675 A2 | 11/1988 |

OTHER PUBLICATIONS

International Search Report in corresponding international application No. PCT/IN2013/000451, Dec. 3, 2013.

*Primary Examiner* — Terrell Matthews
(74) *Attorney, Agent, or Firm* — Day Pitney LLP

(57) ABSTRACT

A fixing arrangement (10) for a screen panel comprising at least a screen panel(11) having side edges/side faces(4,7) on either side. The panel is adapted to be fixed to an adapter bar(1) and said bar(1) is adapted to be mounted on a screen deck frame. This bar(1) extends horizontally over said screen deck frame and between side edge regions of a pair of said screen panels(11), said adapter bar has at least a female portion in the form of a fixing groove (5) on its top surface(21) such that said groove(5) has an internal profile that exactly matches the outer profile of the bottom part(3) of said screen panel(11) for receiving said bottom part(3) securely and snap fitting therewith and said adapter bar(1) is fixed on a portion(2) of said screen deck frame by suitable fixing means.

10 Claims, 6 Drawing Sheets

(56) References Cited

U.S. PATENT DOCUMENTS

| | | | | |
|---|---|---|---|---|
| 5,769,241 A * | 6/1998 | Woodgate | | B07B 1/4645 209/399 |
| 6,253,926 B1 * | 7/2001 | Woodgate | | B07B 1/469 209/399 |
| 6,964,341 B2 * | 11/2005 | Bacho | | B07B 1/46 209/405 |
| 7,717,269 B2 * | 5/2010 | Bacho | | B07B 1/46 209/399 |
| 8,025,154 B2 * | 9/2011 | Kriel | | B07B 1/4645 209/363 |
| 8,281,934 B1 * | 10/2012 | Connolly | | B07B 1/4645 209/392 |
| 8,950,585 B2 * | 2/2015 | Biswadeep | | B07B 1/4645 209/392 |
| 2012/0234737 A1 | 9/2012 | Connolly et al. | | |

* cited by examiner

SNAP FIT SCREEN PANEL AND FIXING SYSTEM

CROSS-REFERENCE TO RELATED APPLICATIONS

This application is a U.S. National Stage of International Application No. PCT/IN2013/000451, filed on 19 Jul. 2013 and published on 30 May 2014, as WO 2014/080415 A1, which claims the benefit of priority to Indian Patent Application No. IN 1330/KOL/2012, filed on 20 Nov. 2012.

FIELD OF THE INVENTION

The present invention in general relates to fixing of screen panels in mining industry, and particularly to an improved snap lock screen panel mechanism adapted for fastening a screen panel and more particularly, to a snap-fit type fixing arrangement and its corresponding screen panel which is secured by snap-fit fixing to an ore screening machine.

BACKGROUND OF THE INVENTION

Traditionally, a wide range of vibrating and other separating screen assemblies are known in the art and are used for screening/separating or grading of minerals in the mining and quarrying industries. Various designs and constructions of both screen panels and fixing arrangements are well known in the art.

The materials are caused to run or flow over the vibrating screen deck. The screen deck includes a number of screen panels that are put together and placed on the supporting frame. Varieties of screening surfaces are available for the industrial vibrating screens. The choice of screening surface for a particular duty mostly depends on the aperture required and the nature of the work. To achieve a high degree of performance of a screening machine the following criterion are very important selection of size and shape of apertures the proportion of open area the material properties of the screening surface, and flexibility of the screen surface.

The surface of the screening panel system for ore screening decks that is now widely used by the mining industry, is usually manufactured from steel, rubber, or polyurethane which replaced the earlier screening cloths and large wire screening frames both in respect of quality and productivity. A mere classification is made based on how they are fixed to the screen. The screen panels are prone to wear due to the nature of screening process and require replacement at regular intervals. This is disadvantageous from a maintenance point of view as the existing conventional fixing arrangement usually have individual elements that need to be removed and subsequently replaced, thus making the replacement process difficult, labour intensive and time consuming.

Such maintenance operations as stated in the preceding paragraph also cause hindrance to the screening operation. This sort of maintenance operations lead to loss of the machine's production capacity. Such losses need to be kept at a minimum.

There has thus been a persistent need to design a suitable fixing arrangement or fastener system that can be used in conjunction with suitable screen panel for its application in mining and quarrying industries so that the replacement process is simple, require less human intervention and also less time consuming hence reducing the downtime of the plant.

The present invention meets the aforesaid long felt need.

All through out the specification including the claims, the words "screen panel", "screen deck" "adapter bar", "fixing rail", "male insert", "female groove", "fixing means", "screening apparatus", "base section", "support", "fastening device" and so on are to be interpreted in the broadest sense of the respective terms and includes all similar items in the field known by other terms, as may be clear to persons skilled in the art. Restriction/limitation, if any, referred to in the specification, is solely by way of example and understanding the present invention.

OBJECTS OF THE INVENTION

It is the, principal object of the present invention to provide a fixing arrangement for a screen panel which involves a very simple construction and mode of operation so that removal and replacement operations of screen panels can be undertaken in a simple and less time consuming manner.

It is a further object of the present invention to provide a fixing arrangement for a screen panel which is reliable and economic.

It is a further object of the present invention to provide an even bed of screen deck by arranging the screen panels a adjacent to each other by applying the improved fixing arrangement.

Yet another object of the present invention is to provide a fixing means, which can be precision made and can be easily maintained, thereby improving the quality and productivity of screening machine.

A further object of the present invention is to provide screen panels arranged on a screen deck system such that each panel has an improved fixing arrangement, by virtue of which removal and replacement operations of the screen panel may be performed without causing hindrance to the screening operation.

How the foregoing objects are achieved and the other aspects of the present invention will be clear from the following description which is purely exemplary and does not impose any limitation on the scope of the invention.

SUMMARY OF THE INVENTION

Accordingly, the present invention provides a fixing arrangement for a screen panel comprising at least a screen panel having side edges/side faces) on either side, said panel is adapted to be fixed to an adapter bar and said bar is adapted to be mounted on a screen deck frame, said bar extends horizontally over said screen deck frame and between side edge regions of a pair of said screen panels, said adapter bar has at least a female portion in the form of a fixing groove on its top surface such that said groove has an internal profile that exactly matches the outer profile of the bottom part of said screen panel for receiving said bottom part securely and snap fitting therewith and said adapter bar is fixed on a portion of said screen deck frame by suitable fixing means.

Preferably, on either side of said screen panel constitutes the male insert, bottom portion of which is a male insert portion, said male insert portion having a profile consisting of extended curved portions symmetrically disposed on either side of it, neck portions atop it, inclined portions beneath said extended curved portions and a flat bottom portion.

More preferably, the profile of said fixing groove comprises of vertical neck portions disposed symmetrically on either side of it, having curved surfaces beneath said neck portions, inclined surfaces beneath said curved surfaces and a flat bottom portion.

Most preferably, said bottom portion has a trapezoidal surface profile having said inclined portions.

There can be a plurality of screen panels detachably fixed on a screen deck frame by means of the fixing arrangement as described hereinbefore, the screen panels forming an even bed of screen deck by arranging said screen panels adjacent to each other.

BRIEF DESCRIPTION OF THE ACCOMPANYING DRAWINGS

The nature and scope of the present invention will be better understood from the accompanying drawings, which are by way of illustration of a preferred embodiment which is exemplary and does not impose any limitation on the scope of the invention. In the accompanying drawings, FIG.1 is a perspective view of a fixing arrangement in accordance with a preferred embodiment of the present invention.

DETAILED DESCRIPTION OF THE INVENTION

Figure 1:
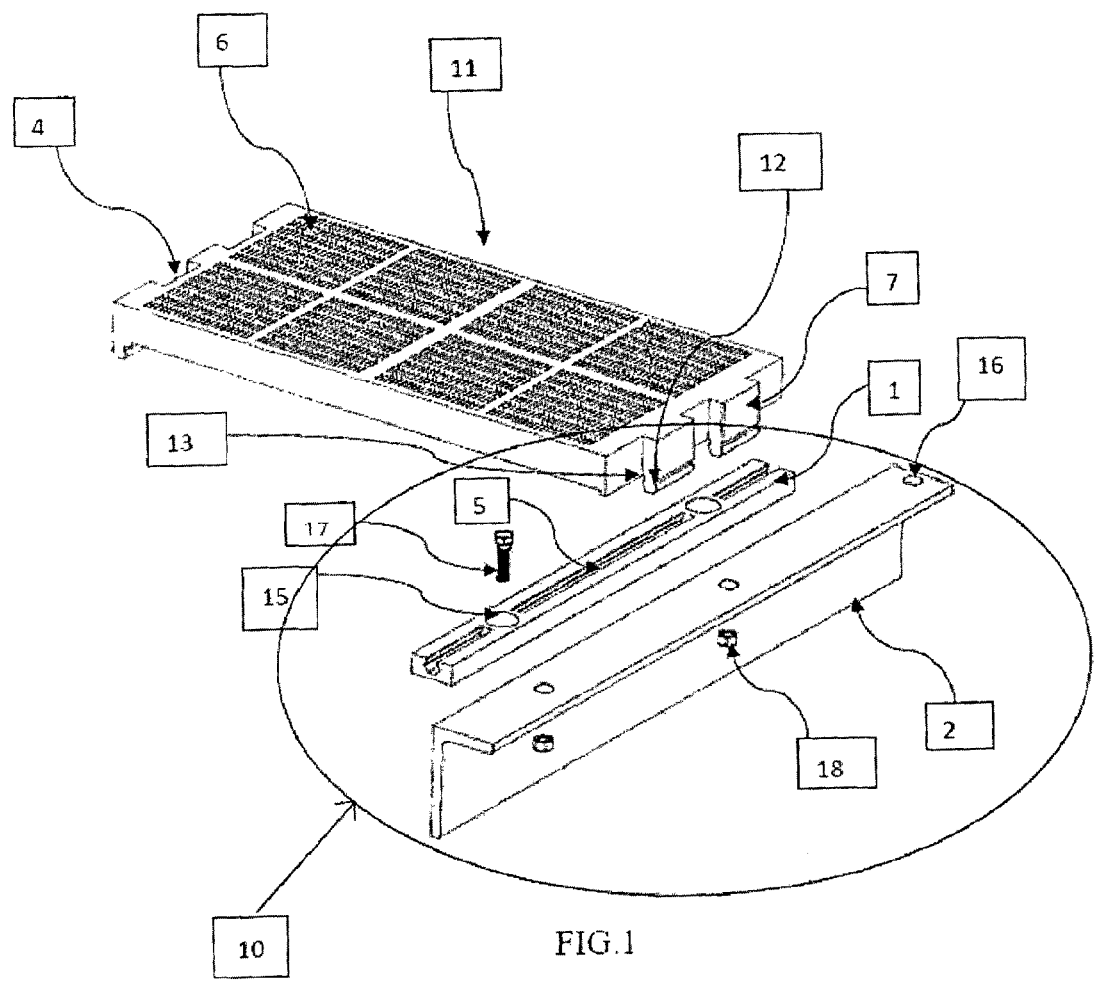

The following describes an exemplary preferred embodiment of the present invention, which is purely for the sake of understanding the performance of the invention, and does not impose any limitation on its scope.

The present invention primarily aims at providing improved snap lock screen panel mechanism adapted for fastening a screen panel and more particularly, to a snap fit type fixing arrangement and its corresponding screen panel, secured by the snap-fit fixing system to an ore screening machine.

The screen panel fixing arrangement comprises of a base section that has a support angle section on which the adapter bar is fixed by suitable fixing media. Alternatively, the adapter bar may be fixed directly to a portion of a screen deck by such fixing media. The adapter bar has the female groove, while the screen panel has a corresponding male part. The female grooved securely receives the male part of the screen panel that snap fits inside the female groove.

The basic constructional feature of the screen panel as described in the preceding paragraph and the advantages derived out of it will now be further explained in the following description with reference to the drawings.

In the drawings, like reference numerals represent like features and the expressions "upper", "lower", "top", "bottom" and like expressions should be construed with reference to the orientation of the screen panel during use.

Furthermore, in the claims and the description the term "fixing arrangement" has been used but it should be understood, that such terminology includes similar terminologies like "fastening device", "fixing apparatus", "fixing means" and the like.

It is also clarified that the term "snap fitting" includes both manual operation and also press fitting operation by mechanical means and both come within the ambit of the present invention.

FIG. 1 represents a fixing arrangement (10) along with the corresponding screen panel (11) in accordance with a preferred embodiment of the present invention.

The fixing arrangement consists of the screen panel (11) which is fixed to the corresponding adapter bar (1) which in turn is fixed to the to the screen deck frame(2). Preferably and not essentially, the screen deck frame has elongated sub-frame angle beams (2) which provide support to it extend along the length of the screen deck. Each screen panel(11) has opposing edges/ side faces(4,7).

In practice, array of the screen panels are fixed to and supported by the screen deck frame to form the continuous screen deck, but for the sake of understanding only one screen panel(11), one adapter bar(1) and one angular beam(2) which supports a screen deck are shown in FIG. 1. It should therefore be understood that there are a plurality of such screen panels(11), adapter bars(1) and angular beams(2) supporting the screen deck system and such arrangement falls well within the scope of the present invention.

The adapter bar or fixing rail (1) is mounted on the screen deck frame support beam (2) through suitable fixing media (17).

In the preferred embodiment shown in FIG. 1, the rails (1) are fixed to the underlying support beams (2) of the screen deck frame through bolts (17) and nuts (18). For that purpose, the beam(2) is provided with holes(16) on its top surface and the adapter bar(1) is provided with bolt holes(15) on its top surface.

The screen panel(11) obviously has an array of apertures (6) on its top surface, thus forming the screening surface. The adapter bar(1) has an elongated groove(5) on its top surface (21){best shown in FIG. 3} running between the bolt holes (15). The bottom portion of the screen panel has an insert portion(3){best shown in FIGS. 2,7 and 8} which acts as the male insert portion. This male insert portion snap fits into the elongated groove(5) on the adapter bar(1), which acts as the female unit.

Figure 2:
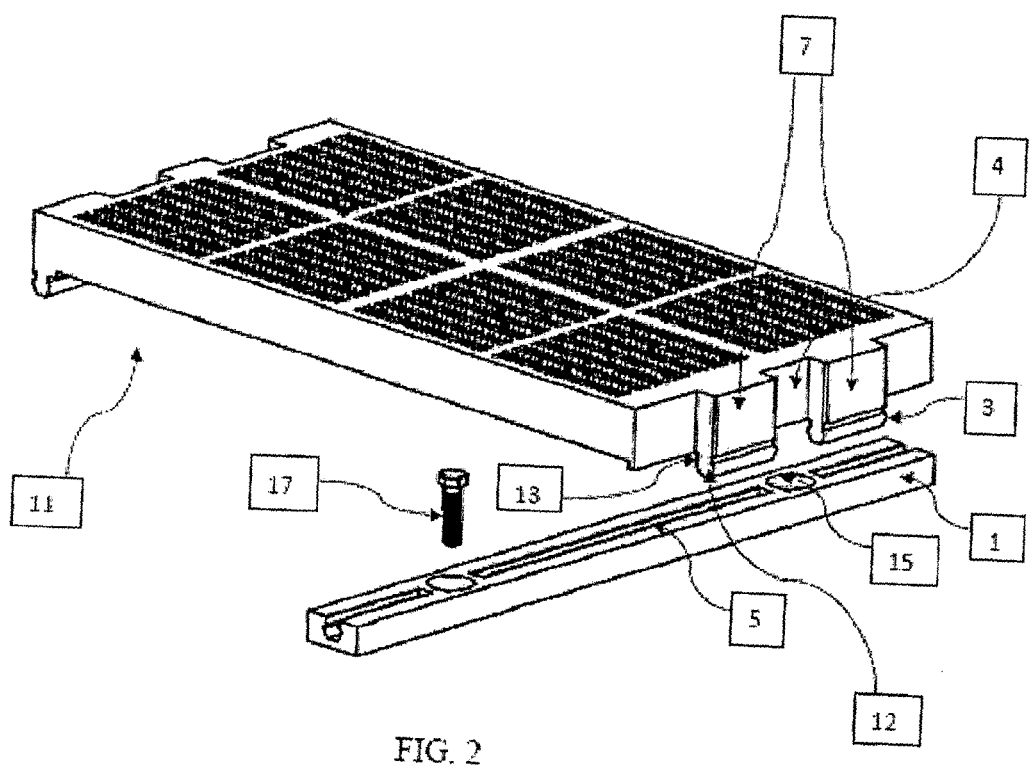
FIG.2 is the perspective view of the base section of the fixing arrangement shown in FIG. 1.
Figure 7:
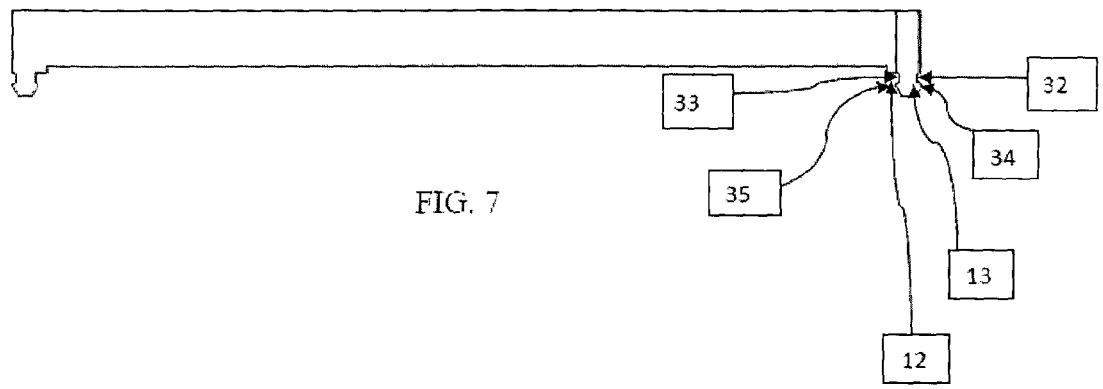
FIG.7 is the screen side view of the screen panel showing the insert portions and the neck surfaces.
Figure 8:
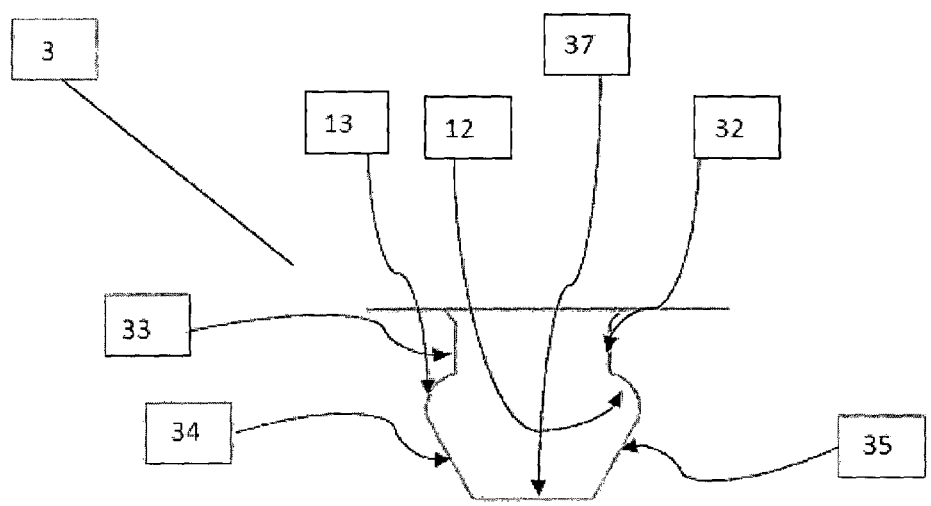
FIG.8 is a cross-sectional view of the bottom part of screen panel.

The male unit(3){best shown in FIGS. 2,7 and 8} at the bottom portion of the screen panel, the female groove(5) on the top surface of the adapter bar(1) and the angular support beam(2) which securedly receives the adapter bar(1) having the screen panel fitted into it, together forms the screen panel fixing arrangement of the present invention. The FIG. 1 shows a portion of the male unit at the bottom portion of the screen panel which are extended curved portions (12,13). These are located at the bottom portion of the male insert(7) which also constitutes one of the side face of the screen panel(11).

There are a plurality of side faces(7,4) for each screen panel(11) and not merely two as shown in FIG. 1.

Further details of the male part at the bottom portion of the screen panel(11) and the female groove(5) on the top surface of the adapter bar(1) and their functionalities will be explained with reference to the FIGS. 3 to 5, 7 and 8.

FIG. 2 is a further elaborate view of the base section of the fixing arrangement shown in FIG. 1, which further elaborates the constructional aspects described hereinbefore with reference to FIG. 1. It additionally shows the male insert portion (3) at the bottom part of one of the side faces(7) of the screen panel(11).

Figure 6:
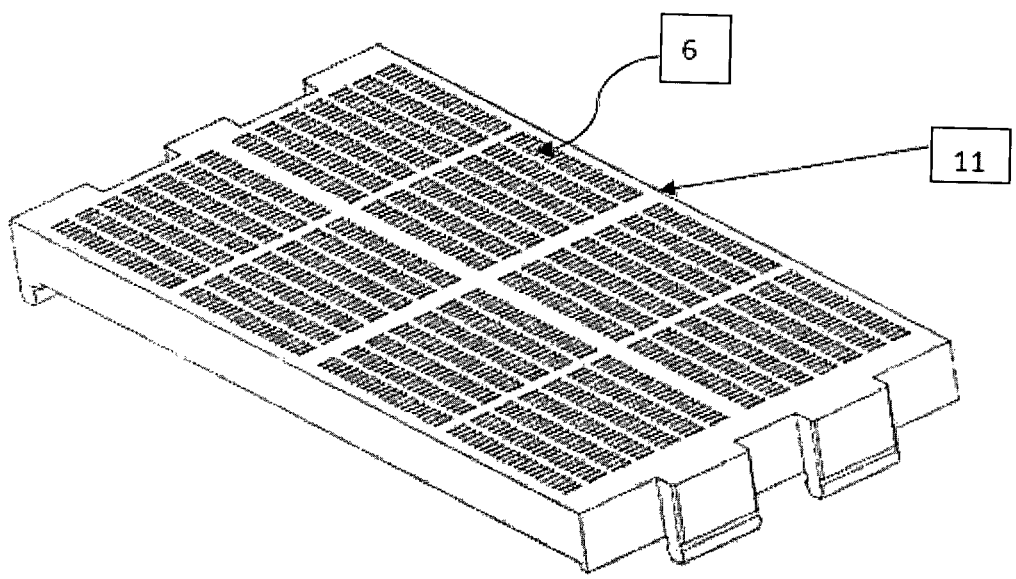
FIG.6 is a perspective view of the screen panel.

FIG. 6 only shows how a typical screen panel according to the present invention looks like. It should be understood that the fixing arrangement according to the present invention is applicable on all types of screen panels known in the art and not merely to the illustration in FIG. 6, which is just exemplary and not consequential to the present invention. It would be clear from FIGS. 2 and 6 that a plurality of screen panels (11) having opposing edges(4,7) with bottom portions(3)

when arranged on a screen deck adjacent to one another, thus forms an even bed of screen deck.

The screen panel (11) can be of materials like polyurethane, rubber etc and may be internally reinforced with one or more metallic/non-metallic component or members. These aspects are however not consequential to the present invention.

Now the configuration of the adapter bar(1) is explained with reference to the FIGS. 3,4 and 5.

Figure 3:
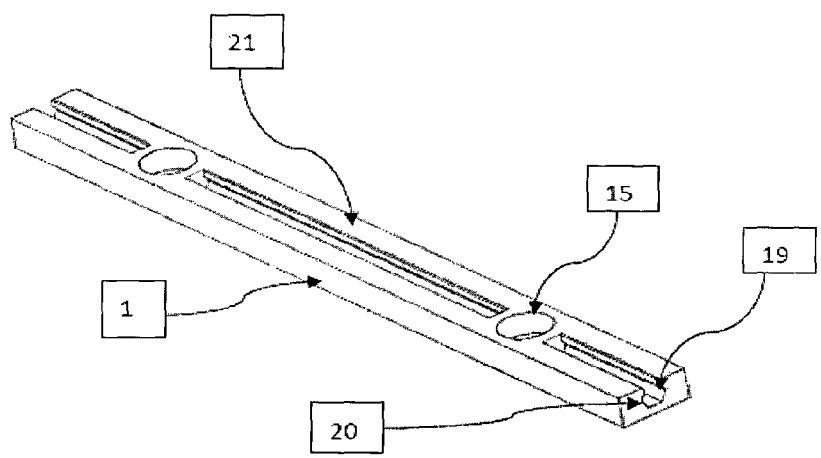
FIG.3 is the top perspective view of the adapter bar of the fixing arrangement shown in FIG. 1.

FIG. 3 shows the top view of the adapter bar(1) having the top surface(21). Along the middle of the top portion(21) runs the female groove(5). The female groove(5) runs between the bolt holes(15). The FIG. 3 also shows the two curved portions (19,20) of the inner profile of the female groove(5).

Figure 4:
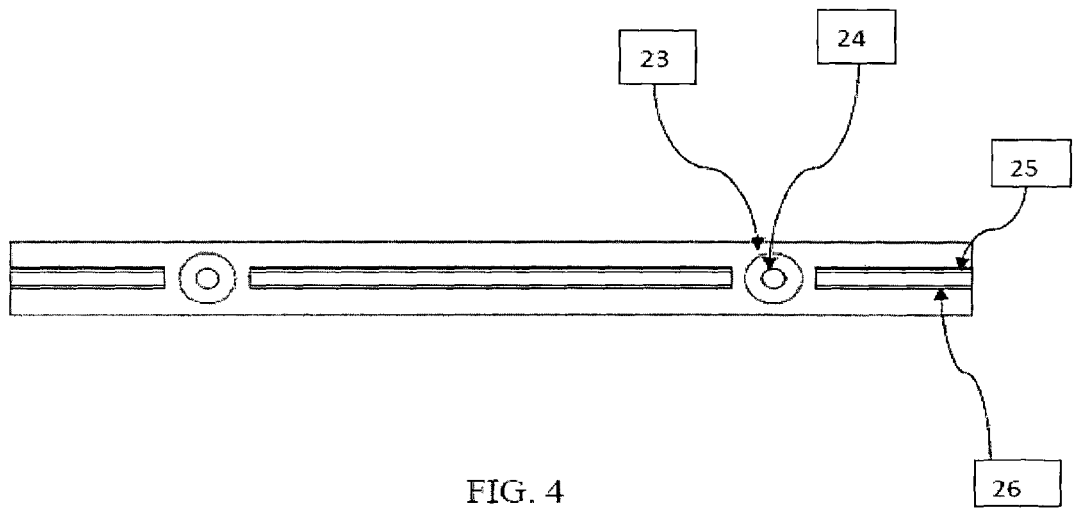
FIG.4 is a horizontal cross-sectional view of the adapter bar shown on FIG. 3.

FIG. 4 is a horizontal cross section of the adapter bar(1) shown in FIG. 3. It shows the internal details of the bolt holes(15). Each have an inner cylindrical hole (24) and an outer stepped cylindrical hole (23). A plurality of these bolt holes(15) rests in between the elongated groves(5) which provide space and help to fix the adapter bar(1) or fixing rail on to the angular beams(2) of the deck support frame(best shown in FIGS. 1 and 2). FIG. 4 also shows the neck portions (25,26) of the female groove(5) of the adapter bar(1).

Figure 5:
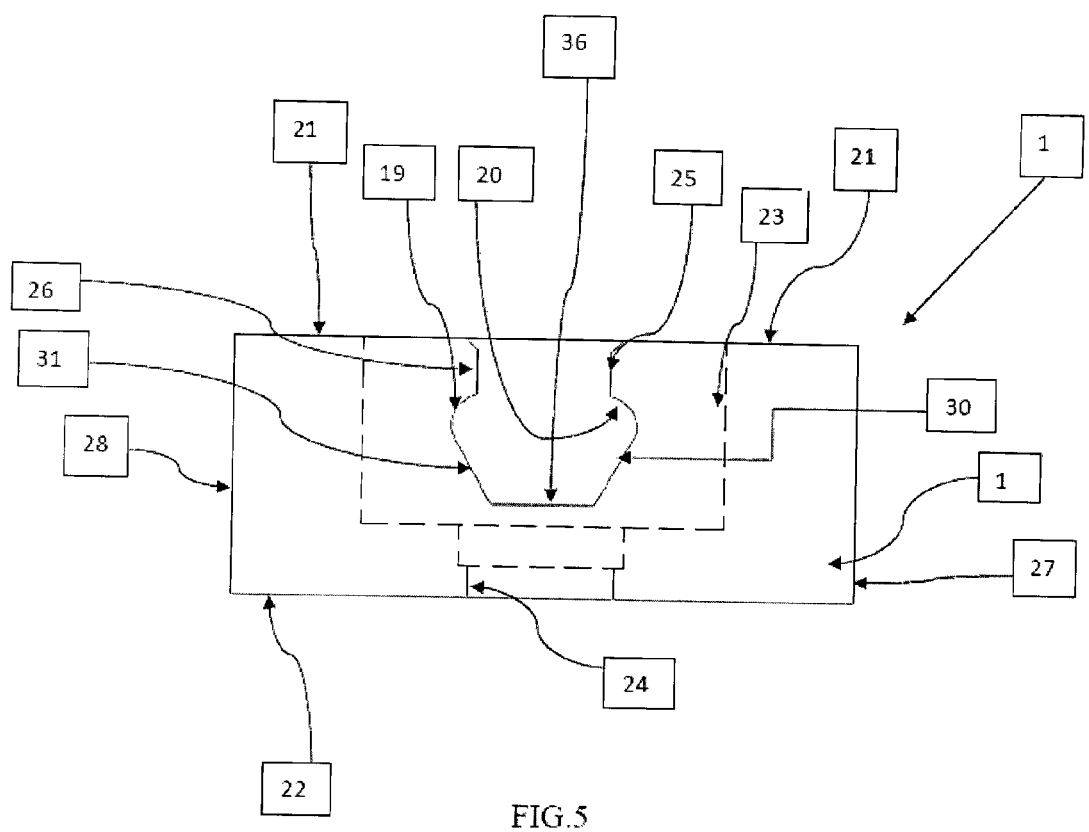
FIG.5 is a vertical cross sectional view of the adapter bar shown in FIG. 3.

The elaborate configuration of the female groove(5) is shown in the vertical cross-sectional view of the adapter bar(1) in FIG. 5. FIG. 5 also shows the bottom portion(22) of the adapter bar and its side edges(27,28).

As it would be clear from FIG. 5 the female groove(5) of the adapter bar(1) or fixing rail principally has the following geometries: A bottom flat portion(36), slanting surfaces(30, 32) symmetrically disposed on either side of the groove(5) above the flat bottom portion(36), curved portions(19,20) immediately above the slanting surfaces(30,31) and top neck portions(25,26) above the curved portions.

Now the configuration of the bottom portion of the screen panel (11) is explained with reference to the FIGS. 7 and 8. The screen panel(11) includes the side edges(7) which constitute the male inserts(7), the bottom portion(3) whereof have extended curved portions (12,13) which are the integral parts of the side edges of the screen panel. This would be clear from the FIG. 7. FIG. 7 also shows the trapezoidal profile of the male insert portion(3), which is the bottom portion of the side face(7) of the screen panel(11). It also shows the neck portions(32,33) of the male insert portion(3) and also its inclined, portions(34,35).

Now, the detailed configuration of the male insert portion (3) or the bottom portion of the side edge (7) is explained below with reference to FIG. 8. It will be clear from FIGS. 1,2,6 and 7 that the male insert portion(3) is an integral part of the screen panel(11). To be precise, this male insert portion(3) lies at the bottom portion of the side edge(7) of the screen panel(11), which bottom portion(3) has an overall trapezoidal profile, for matching the profile of the female groove(5) of the adapter bar(1). This would be clear on referring to the FIGS. 5 and 8 in particular and to the description of such figures.

As clearly illustrated in FIG. 8, the male insert portion(3) consists of a flat bottom portion(37), above which lies the inclined surfaces(34,35) symmetrically disposed on either side. This is followed by the extended curved portions (12,13) which lie above the inclined surfaces(34,35). Above the extended curved portions(12,13) lie the neck portions(32,33). This profile matches the profile of the female groove(5) (best represented in FIG. 5 and its description above) so that the male insert portion(3) at the bottom portion of the side edge (7) of a screen panel(11) fits into the female groove(5) of the adapter bar(1) easily.

Now the detailed functioning of the fixing arrangement is explained with reference to FIGS. 2 to 8.

Referring back to FIG. 2, a plurality of fixing members (1) or more commonly fixing rails or adapter bars (1) extend over the screen deck frame and between side edge regions of a pair of adjacent screen panels(11). Each adapter bar or fixing rail (1) extends along a respective support beam (2) so that the fixing rails (1) are parallel to each other and positioned between adjacent screen panels (11).

Plurality of panels are placed adjacent to each other and the side edges(4,7) of which form an interlocking zigzag/stepped pattern, thus facilitating fixing and holding of the panels, which in turn mates with the corresponding opposing groove of the adjacent panel(11). The top surfaces of adjacent panels are flushed thus creating an even bed of the screen deck.

It would be clear from FIGS. 1 and 2 in particular, that an adapter bar(1) is fixed to an angular beam(2), which supports the screen deck. For that purpose, the adapter bar(15) has bolt holes(15) and the angular beam has holes(16).

The bolt holes (15) consist of outer cylindrical portion (23) going in vertically downwards and then a stepped second cylindrical portion (24)(Best shown in FIGS. 4 and 5). A plurality of these bolt holes rest in between the elongated groves(5) which provide space and help to fix the adapter bar or fixing rail on to the deck support frame.

The bolts (17) are passed through the bolt holes (15) and also through fixing holes (16) on the screen deck frame. Then nus(18) are applied for firmly fixing the adapter bar(1) onto the beam(2) supporting the screen deck frame.

Alternatively, the adapter bar(1) may be directly fixed on the screen deck frame and it is within the scope of present invention. The system of bolt holes(15) on the adapter bar(1), the holes(16) on the screen deck frame or on the angular beam (2)supporting the deck frame, the bolts(17) and nuts(18) may be replaced by other fixing media and it is within the scope of the present invention.

Now, how the female groove(5) fits into the male insert portion(3) is explained with reference to the FIGS. 3 to 5, 7 and 8. As clearly seen in these figures both the female part(5) and the male part(3) of the fixing arrangement have matching outer and inner profiles respectively, so that the male part(3) easily fits into the female part(5).

The adapter bar or fixing rail has the female groove (5) and is sized so that it's top surfaces is located below the screening surface (6) of the screen panels (11). When the bottom portion (3) of the screen panel(11) or in other words, the male insert portion is gradually inserted into the female groove(5), the neck surfaces (32,33) of the male insert(3) of the screen panel(11) mate through the adjacent neck surfaces (25,26) of the female groove(5).

The extended curved portions (12,13)of the male portion (3) of the screen panel(11) mate with the curved portions(19, 20) of the female groove and then the inclined portions(34, 35) of the male insert(3) mate with the corresponding inclined portions(30,31) of the female groove(5). Finally, the flat bottom portion(37) of the male part(3) fits into the flat bottom portion(36) of the female groove. This happens all along the female groove(5) wherever a male part(3) of one or more screen panels(11) are inserted.

Thus perfect fitting is achieved in a simple manner by virtue of this construction. It should be understood from this construction and its operation that removal and replacement of the screen panels may be done easily without causing hindrance to screening operations, even by unskilled persons. The attachment of the adapter bar to the screen deck(2) or to the support therefor ensures that the screen deck is also not hampered or misaligned during removal and replacement of screen panels.

When fixed together by press fitting the inner inclined surfaces (30) (31) of the female groove(5) is in mate with the screen panel insert inclined portion (34) (35). The bolts (17) are passed through the bolt holes (15) which have inner cylindrical hole (24) and outer stepped cylindrical hole (23) and also through fixing holes (16) on the screen deck frame. Bolt holes (15) may be incorporated into the adapter bar or fixing rail (1) to receive the bolts (17) and other fixing media like rivets, pins, lug arrangements and so on, for fixing of the rails to the screen deck frame (2).

Removal and replacement of the screen panels(11) thus become very easy without causing hindrance to the screening operation and thus uninterrupted screening operation can be done while removing and replacing the worn out screen panels. The construction of the fixing arrangement has ensured that this can be done by some one even without having substantial skill, if not unskilled. This removal and replacement operation can be done very briskly due to the simplicity of the construction. The screen panels may be snap fitted by hand onto the adapter bar or some mechanical means may be applied. This is true for removal operations as well. Further, the adapter bar(1) is firmly attached to the screen deck frame or to a support for the screen deck frame. This ensures that the screen deck system is not hampered during removal and replacement operation.

It should be understood that by applying the fixing arrangement of the present invention, a screen panel, an adapter bar and a portion of a screen deck may be all attached almost simultaneously, one immediately after the other, in that order. Alternatively, the adapter bar(1) is fixed to the portion of the screen deck and thereafter one or more screen panels are attached to it. Of course, during removal and replacement operations, only the screen panel(11) has to removed and a fresh one is snap fitted onto the adapter bar(1), which is detachably or fixedly secured to a portion of the screen deck.

The improved snap fit screen panel and its fixing system of the present invention in a screening machine reduces the loading time for replacing the screen panel. The fixing arrangement is simple and can be economically manufactured. Further, snap fit type fixing arrangement and its corresponding screen panel, secured by the snap-fit fixing system of an ore screening machine is reliable, provide an even bed of screen surface and exhibit trouble free operation. Furthermore, the fixing arrangement of the present invention provide an easy way to remove the screen panel as stated before with much ease, consume less time and facilitates careful monitoring for repairing a machine. There is no need to interfere with the individual fixing elements at all. The present invention has been described with reference to a preferred embodiment and some drawings which are all non-limiting and the present invention embraces all possible modifications within the spirit of what has been described hereinbefore and claimed in the appended claims.

We is claimed is:

1. A fixing arrangement for a screen panel comprising at least a screen panel having side edges/side faces on either side, said panel adapted to be fixed to an adapter bar and said bar configured to be mounted on a screen deck frame so as to separately connect to said screen panel and said screen deck frame, the screen panel including extended curved portions on the side edge there out which are integral thereto for connection to the screen deck frame said bar extending horizontally over said screen deck frame and between side edge regions of a pair of said screen panels, said adapter bar having at least a female portion in the form of a fixing groove on its top surface such that said groove has an internal profile that exactly matches the outer profile of the bottom part of said screen panel for receiving said bottom part securely on the top surface of said adapter and snap fitting therewith and said adapter bar fixed on a top portion of said screen deck frame by suitable fixing means so as to separate said deck frame from said screen panel.

2. The fixing arrangement as claimed in claim 1 wherein one side face on either side of said screen panel constitutes a male insert, a bottom portion of which is a male insert portion, said male insert portion having a profile consisting of extended curved portions symmetrically disposed on either side thereof, neck portions atop, inclined portions beneath said extended curved portions, and a flat bottom portion.

3. The fixing arrangement as claimed in claim 1, wherein the profile of said fixing groove comprises of vertical neck portions disposed symmetrically on either side thereof, having curved surfaces beneath said neck portions, inclined surfaces beneath said curved surfaces and a flat bottom portion.

4. The fixing arrangement as claimed in claim 2, wherein said bottom portion has a trapezoidal surface profile having said inclined portions.

5. The fixing arrangement as claimed in claim 2 wherein said neck portions of said male insert are adapted to mate with corresponding neck portions of said fixing groove and said curved portions of said fixing groove are adapted to mate with corresponding extended curved portions of said male insert portion.

6. The fixing arrangement as claimed in claim 2 wherein inclined surfaces of said fixing groove are adapted to mate with corresponding inclined surfaces of said male insert portion.

7. The fixing arrangement as claimed in claim 2 wherein said flat bottom portion of said fixing groove is adapted to mate with a corresponding flat bottom portion of said male insert portion thereby snap fitting said screen panel on said adapter bar.

8. The fixing arrangement as claimed in claim 1 wherein top surface of said adapter bar is also provided with bolt holes and said fixing groove runs along said top surface in between said bolt holes, said bar being fixed to an angular supporting beam for said screen deck by means of bolting along said holes and through holes on said beam.

9. The fixing arrangement as claimed in claim 1 wherein the screen panel has a screen surface having apertures extending over the length of the panel and said adapter bar is sized such that it is located below said screening surface.

10. A plurality of screen panels detachably fixed on a screen deck frame by means of the fixing arrangement as claimed in claim 9 said screen panels forming an even bed of screen deck by arranging said screen panels adjacent to each other.

* * * * *